US011197550B2

(12) United States Patent
Zheng et al.

(10) Patent No.: US 11,197,550 B2
(45) Date of Patent: Dec. 14, 2021

(54) RATTAN CHAIR BACK CONNECTOR, CONNECTION ASSEMBLY, AND RATTAN CHAIR

(71) Applicant: Zhejiang Yotrio Group Co., Ltd., Linhai (CN)

(72) Inventors: Tao Zheng, Linhai (CN); Jianqiang Xie, Linhai (CN)

(73) Assignee: Zhejiang Yotrio Group Co., Ltd., Linhai (CN)

( * ) Notice: Subject to any disclaimer, the term of this patent is extended or adjusted under 35 U.S.C. 154(b) by 96 days.

(21) Appl. No.: 16/712,314

(22) Filed: Dec. 12, 2019

(65) Prior Publication Data

US 2020/0237097 A1  Jul. 30, 2020

(30) Foreign Application Priority Data

Jan. 30, 2019  (CN) .......................... 201920168343.7

(51) Int. Cl.
  *A47C 7/00* (2006.01)
  *A47C 5/02* (2006.01)
  *A47C 7/02* (2006.01)
  *A47C 7/40* (2006.01)
  *A47C 23/00* (2006.01)
  *A47C 31/02* (2006.01)
  *A47C 27/00* (2006.01)

(52) U.S. Cl.
  CPC .................. *A47C 5/02* (2013.01); *A47C 7/02* (2013.01); *A47C 7/40* (2013.01); *A47C 23/00* (2013.01); *A47C 27/00* (2013.01); *A47C 31/023* (2013.01)

(58) Field of Classification Search
  CPC .... A47C 5/02; A47C 5/06; A47C 5/08; A47C 5/10; A47C 7/02; A47C 7/40; A47C 23/00; A47C 27/00; A47C 31/023
  See application file for complete search history.

(56) References Cited

U.S. PATENT DOCUMENTS

| 7,481,495 | B2 * | 1/2009 | Wang ........................ A47C 5/06 160/392 |
| 7,650,724 | B2 * | 1/2010 | Hallett ...................... A47C 5/04 52/222 |

(Continued)

FOREIGN PATENT DOCUMENTS

WO   WO-2017177774 A1 *  10/2017  ............. B29C 43/52

*Primary Examiner* — Syed A Islam
(74) *Attorney, Agent, or Firm* — Schwegman Lundberg & Woessner, P.A.

(57) ABSTRACT

A connector comprises a body, a first connection part, and a second connection part. The first connection part and the second connection part are respectively disposed at two adjacent side surfaces of the body of the connector. The first connection part and a horizontal rod are engaged, the second connection part and a vertical rod are engaged, to form a detachable connection between the horizontal rod and the vertical rod with the connector. Without dealing with an over edging operation of a boundary and a corner of the frame, the rattan pieces are directly connected to the horizontal rod or the vertical rod, to perform the weaving of the chair back, which greatly reduces the difficulty of weaving. The first side surface is a step shaped surface, which reduces the difficulty of the engaged connection between the first connection part and the horizontal rod. The connector is a one-piece structure.

12 Claims, 5 Drawing Sheets

(56) References Cited

U.S. PATENT DOCUMENTS

| | | | |
|---|---|---|---|
| 8,317,270 B2* | 11/2012 | Tseng | A47C 5/06 |
| | | | 297/452.2 |
| 8,523,283 B2* | 9/2013 | Lee | A47C 7/24 |
| | | | 297/440.11 |
| 8,919,884 B2* | 12/2014 | Lee | A47C 5/06 |
| | | | 297/440.11 |
| 9,700,141 B2* | 7/2017 | Orlandoni | A47C 31/02 |
| 10,722,035 B2* | 7/2020 | Li | B29C 43/52 |
| 2006/0163934 A1* | 7/2006 | Chen | A47C 5/06 |
| | | | 297/440.11 |

* cited by examiner

RATTAN CHAIR BACK CONNECTOR, CONNECTION ASSEMBLY, AND RATTAN CHAIR

CROSS-REFERENCE TO RELATED APPLICATIONS

This Non-provisional application claims the benefit of priority under 35 U.S.C. § 119(a) on Chinese Patent Application No(s). 201920168343.7 filed on Jan. 30, 2019, the disclosure of which is hereby incorporated by reference in its entirety.

BACKGROUND OF THE INVENTION

Field of the Invention

This invention relates to a technical field of rattan, and more particularly, to a rattan chair back connector, a connection assembly, and a rattan chair.

Description of the Related Art

Most of the current rattan products are hand-woven, requiring workers have certain vine-making skills. Especially in the weaving of the back chair of the rattan chair, it is generally woven in the back frame of the chair in an all-inclusive manner. When weaving to the corners of the frame, the weaving difficulty is greatly improved, and the requirements for the knitting skill of the worker are greatly improved, and the quality of the rattan product also depends on the worker's rattan technique.

The existing method of rattan not only has high labor cost and time cost, but also the quality of the products is uneven, which is not conducive to mass production.

There are also a few that split the frame into horizontal rods and vertical bars, and the woven rattan pieces are directly attached to the horizontal rods and vertical bars, and then horizontal rods and vertical bars are assembled by the connection assembly. For example, the prior art discloses "a rattan weaving structure and a rattan chair made by the structure", which are respectively connected to the horizontal rod and vertical bar by the fixing member 1 and the fixing member 2 respectively. After that, by flipping the fixing member 1 and the fixing member 2, the fixing member 1 and the fixing member are fixed by bolts, and the assembling operation is also very troublesome, which is disadvantageous for production.

BRIEF SUMMARY OF THE INVENTION

In order to overcome at least one deficiency of the prior art, this invention provides a rattan chair back connector, a connection assembly, and a rattan chair. A connector is used to form a detachable connection of a frame of a rattan chair back, and the connector is in a one-piece structure. It is only necessary to fix rattan pieces on a boundary of the frame, and then assemble the frame through the connector, so there is no need to do the assembly and flipping, which reduces the difficulty of assembly, saves labor costs and time costs, and also improves the overall aesthetics of the rattan chair.

The technical solution adopted by the present invention is as follows: the rattan chair back connector comprises a body, a first connection part, and a second connection part. The body has a first side surface and a second side surface, and the first side surface and the second side surface are adjacent. The first side surface in a step shape comprises a first step surface and a second step surface, and the second step surface is higher than the first step surface. The first connection part is disposed at the first side surface, and the second connection part is disposed at the second side surface.

Furthermore, the rattan chair back connector may further comprise a third connection part, the third connection part may be disposed at the second step surface, and a first connection hole may be disposed at the third connection part.

Furthermore, the body may have a third side surface opposite the first side surface, the body may have a first rattan slot, a slot mouth of the first rattan slot may turn towards the third side surface of the body, and an opening gap of the slot mouth of the first rattan slot may be smaller than a width of a slot body.

The connection assembly comprise the rattan chair back connector as described above. The connection assembly further comprises a frame, the frame comprises a horizontal rod and a vertical rod, the first connection part of the connector and the horizontal rod are engaged, and the second connection part of the connector and the vertical rod are engaged.

Furthermore, a second rattan slot and a third rattan slot may be respectively disposed at any one of the horizontal rod and the vertical rod, the second rattan slot and the third rattan slot may be respectively disposed along a length direction of the horizontal rod and the vertical rod, and an opening gap of the second rattan slot and the third rattan slot may be smaller than a width of a slot body.

Furthermore, the horizontal rod and the vertical rod both may be internal hollow and thin-walled tube shaped, the second rattan slot may be formed by an inwardly depression of one of the sides of the horizontal rod, to form a first through slot inside the horizontal rod; a structure of the third rattan slot may be same with a structure of the second rattan slot; the third rattan slot may be disposed at the vertical rod, forming a second through slot inside the vertical rod, a shape of the first connection part of the connector may be match with a shape of the first through slot, and a structure of the second connection part of the connector may be match with a shape of the second through slot.

Furthermore, the vertical rod may comprise a seat section and a backrest section, a connection between the seat section and the backrest section may be a one-piece arc-shaped connection, and an angle between the seat section and the backrest section may be larger than 90°.

Furthermore, the connection assembly may further comprise a fixer, a second connection hole may be disposed at the horizontal rod, the first connection hole of the third connection part and the second connection hole of the horizontal rod may be cooperated with the fixer to form a fix connection.

The rattan chair comprises the rattan chair back connection assembly as described above. The rattan chair further comprises a support frame and a chair back, the frame of the rattan chair back connection assembly is fixedly disposed at the support frame, the chair back is disposed at the frame, the chair back comprises rattan pieces and a lock bar, the rattan pieces are woven from rattan; and the lock bar is disposed at a surrounding of the rattan pieces for an engaged connection between the frame and the connector.

Furthermore, the support frame may comprise two support feet and two support rods, two support rods both may be disposed between two support feet and may be fixedly connected to the support feet, and the frame may be fixedly connected to two support rods.

The beneficial effects of the invention are as follows: The first connection part and the second connection part are respectively disposed at two adjacent side surfaces of the body of the connector. The first connection part and the horizontal rod are engaged, the second connection part and the vertical rod are engaged, to form a detachable connection between the horizontal rod and the vertical rod with the connector. Without dealing with an over edging operation of a boundary and a corner of the frame, the rattan pieces are directly connected to the horizontal rod or the vertical rod, to perform the weaving of the chair back, which greatly reduces the difficulty of weaving. The first side surface is a step shaped surface, which reduces the difficulty of the engaged connection between the first connection part and the horizontal rod. The connector is in a one-piece structure, so there is no need to do the assembly and flipping, which reduces the difficulty of assembly, saves labor costs and time costs, and also improves the overall aesthetics of the rattan chair.

The reference numerals in the figure are as follows: 1, rattan chair back connection assembly; 11, frame; 111, horizontal rod; 1111, second connection hole; 1112, second rattan slot; 1113, first through slot; 112, vertical rod; 1121, third rattan slot; 1122, second through slot; 1123, seat section; 1124, backrest section; 12, connector; 121, body; 1211, first side surface; 1212, second side surface; 1213, first step surface; 1214, second step surface; 1215, first rattan slot; 1216, third side surface; 122, first connection part; 123, second connection part; 124, third connection part; 1241, first connection hole; 13, fixer; 2, chair back; 21, rattan pieces; 22, lock bar; 3, support frame; 31, support foot; 311, armrest; 312, foot; 32, support rod.

DETAILED DESCRIPTION OF THE INVENTION

The present invention will be described in detail below with reference to the accompanying drawings.

Figure 1:
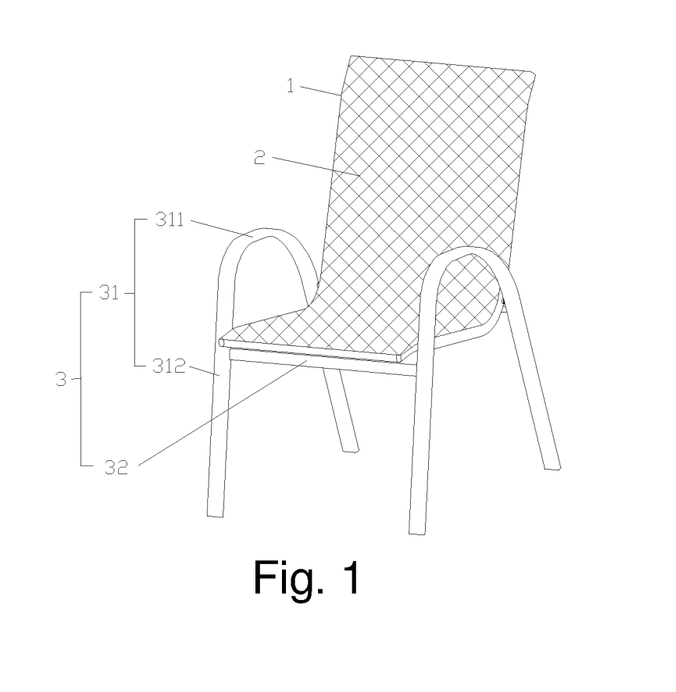
FIG. 1 is a schematic diagram of a rattan chair in embodiment of this invention.

Please refer to FIG. 1, this invention provides a rattan chair, including a rattan chair back connection assembly 1, a chair back 2, and a support frame 3.

Figure 4:
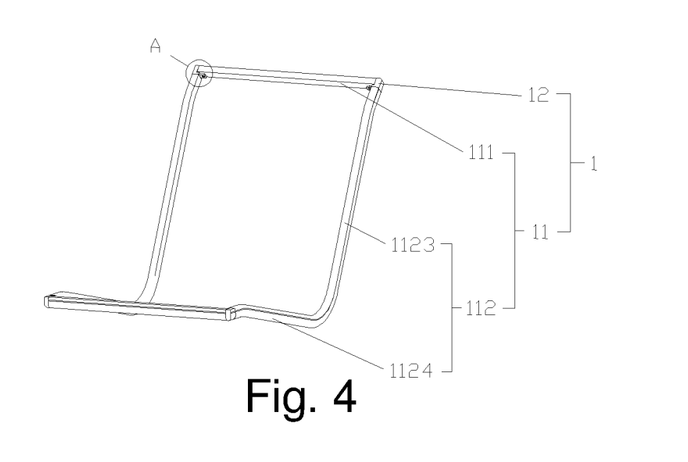
FIG. 4 is a schematic diagram of a connection assembly in embodiment of this invention.
Figure 5:
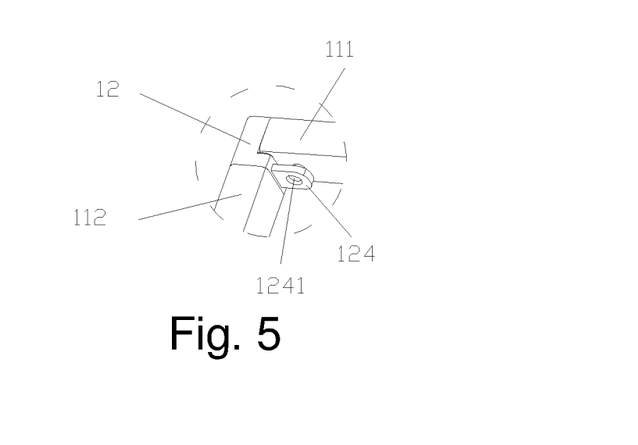
FIG. 5 is a partially enlarged schematic view of the portion A in FIG. 4.

Please refer to FIG. 4, the rattan chair back connection assembly 1 includes a frame 11, a connector 12 and a fixer 13. The chair back 2 includes rattan pieces 21 and a lock bar 22, and the rattan pieces 21 are woven from rattan. The lock bar 22 is disposed at a surrounding of the rattan pieces 21, for an engaged connection between the frame 11 and the connector 12.

The frame 11 includes a horizontal rod 111 and a vertical rod 112, and the horizontal rod 111 and the vertical rod 112 are detachably connected by the connector 12 and the fixer 13. The connector 12 includes a body 121, a first connection part 122, a second connection part 123 and a third connection part 124.

Figure 2:
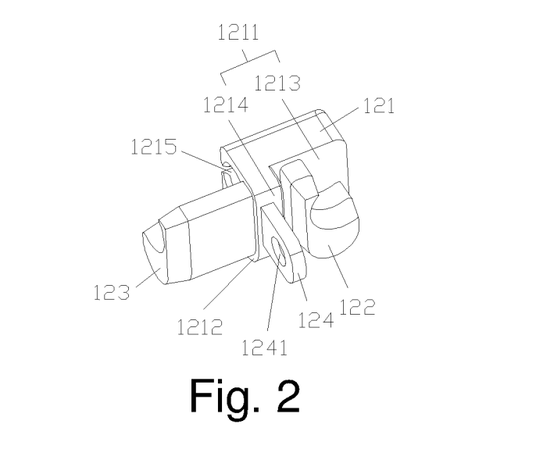
FIG. 2 is a schematic diagram of a connector in embodiment of this invention.
Figure 3:
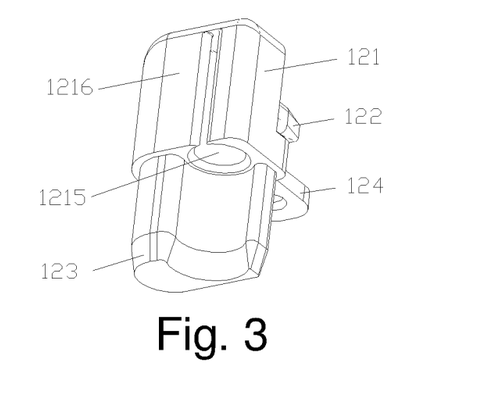
FIG. 3 is another schematic diagram of a connector in embodiment of this invention.

Please refer to FIG. 2-3, the body 121 has a first side surface 1211 and a second side surface 1212 which are adjacent. The first connection part 122 is disposed at the first side surface 1211, and the second connection part 123 is disposed at the second side surface 1212. The first side surface 1211 in a step shape includes a first step surface 1213 and a second step surface 1214. The second step surface 1214 is higher than the first step surface 1213.

The first connection part 122 and the second connection part 123 are respectively disposed at two adjacent side surfaces of the body 121 of the connector 12. Please refer to FIGS. 4, 5, 11, and 12, the first connection part 122 and the horizontal rod 111 are engaged, the second connection part 123 and the vertical rod 112 are engaged, to form a detachable connection between the horizontal rod 111 and the vertical rod 112 with the connector 12. Without dealing with an over edging operation of a boundary and a corner of the frame 11, the rattan pieces 21 are directly connected to the horizontal rod 111 or the vertical rod 112, to perform the weaving of the chair back 2, which greatly reduces the difficulty of weaving. The first side surface 1211 is a step shaped surface, which reduces the difficulty of the engaged connection between the first connection part 122 and the horizontal rod 111. The connector 12 is in a one-piece structure, so there is no need to do the assembly and flipping, which reduces the difficulty of assembly, saves labor costs and time costs, and also improves the overall aesthetics of the rattan chair.

The third connection part 124 which is in a plate like shape is disposed at the second step surface 1214, and a free end of the third connection part 124 is in an arc shape.

A first connection hole 1241 is disposed at the third connection part 124, and a second connection hole 1111 is disposed at an end of the horizontal rod 111. The first connection hole 1241 and the second connection hole 1111 are cooperated with the fixer 13 to form a fix connection. Thus, the third connection part 124 is fixedly connected to the horizontal rod 111. In this embodiment, the fixer 13 is a screw, and the second connection hole 1111 is a threaded hole.

The body 121 further has a third side surface 1216 opposite the first side surface 1211. The body 121 has a first rattan slot 1215, for an insert of the lock bar 22 of an end of the rattan pieces 21. Specially, a slot mouth of the first rattan slot 1215 turn towards the third side surface 1216 of the body 121. An opening gap of the slot mouth of the first rattan slot 1215 is smaller than a width of a slot body, so the lock bar 22 can only be inserted from an end of the slot mouth into the first rattan slot 1215 and move along a length direction of the first rattan slot 1215, but cannot be threaded out of the slot mouth, thereby limiting the position of the rattan pieces 21.

After inserting the rattan pieces 21 into the first rattan slot 1215, the lock bar 22 is limited inside the slot, and the rattan pieces 21 are threaded out of the slot mouth. Please refer to FIG. 6-10, a second rattan slot 1112 and a third rattan slot 1121 are respectively disposed at any one of the horizontal rod 111 and the vertical rod 112. The second rattan slot 1112 and the third rattan slot 1121 are respectively disposed along a length direction of the horizontal rod 111 and the vertical rod 112, for an inserting of the lock bar 22.

An opening gap of the second rattan slot 1112 and the third rattan slot 1121 is smaller than a width of a slot body, preventing the lock bar 22 from slipping out of a gap of the slot mouth, and the slot mouth is used for a passage of a rattan. A function of the second rattan slot 1112 and the third rattan slot 1121 is same as a function of the first rattan slot 1215.

Figure 9:
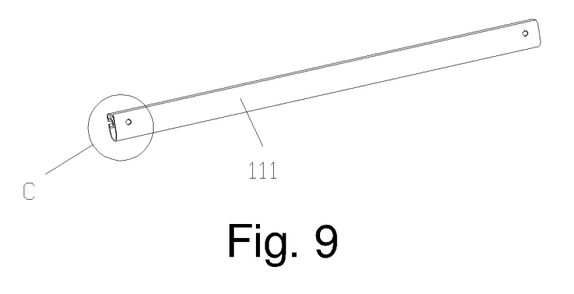
FIG. 9 is a schematic diagram of a horizontal rod in embodiment of this invention.
Figure 10:
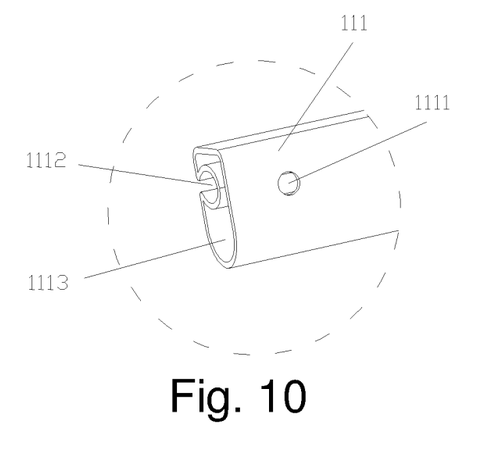
FIG. 10 is a partially enlarged schematic view of the portion C in FIG. 9.

Specially, the horizontal rod 111 and the vertical rod 112 both are internal hollow, and thin-walled tube shaped. The second rattan slot 1112 is formed by an inwardly depression of one of the sides of the horizontal rod 111, to form a first through slot 1113 inside the horizontal rod 111. A shape of the first connection part 122 of the connector 12 is match with a shape of the first through slot 1113.

Figure 6:
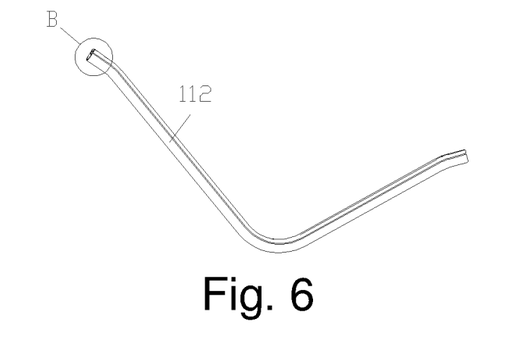
FIG. 6 is a schematic diagram of a vertical rod in embodiment of this invention.
Figure 7:
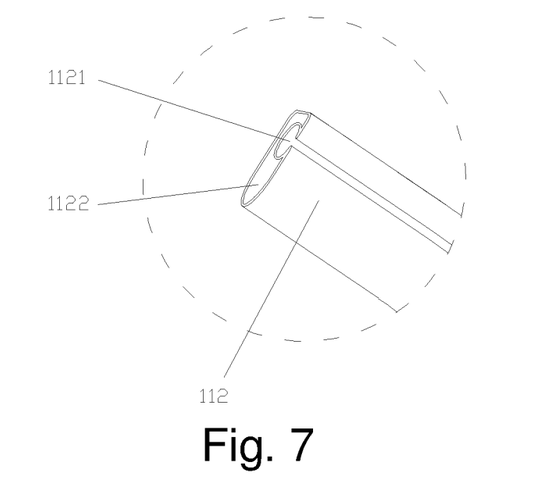
FIG. 7 is a partially enlarged schematic view of the portion B in FIG. 6.
Figure 8:
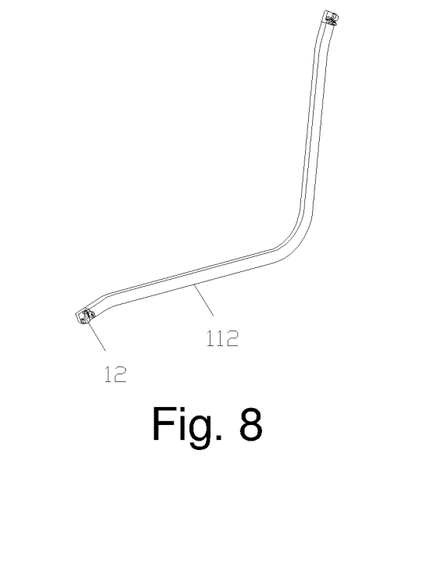
FIG. 8 is a schematic diagram of the vertical rod and the connector in embodiment of this invention.

A structure of the third rattan slot 1121 is same with a structure of the second rattan slot 1112. The third rattan slot 1121 is disposed at the vertical rod 112, forming a second through slot 1122 inside the vertical rod 112. A structure of the second connection part 123 of the connector 12 is match with a shape of the second through slot 1122.

Figure 11:
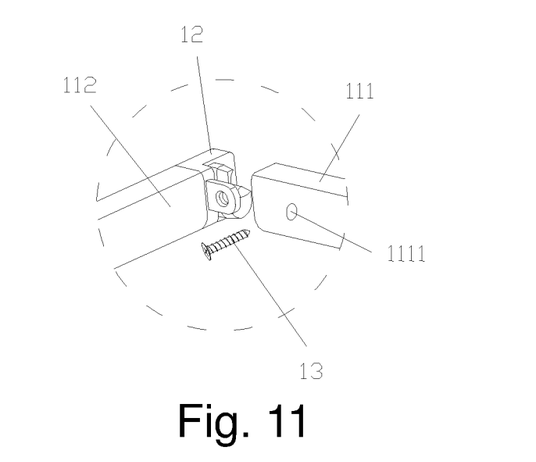
FIG. 11 is a schematic diagram of the vertical rod, the horizontal rod, and the connector in embodiment of this invention.
Figure 12:
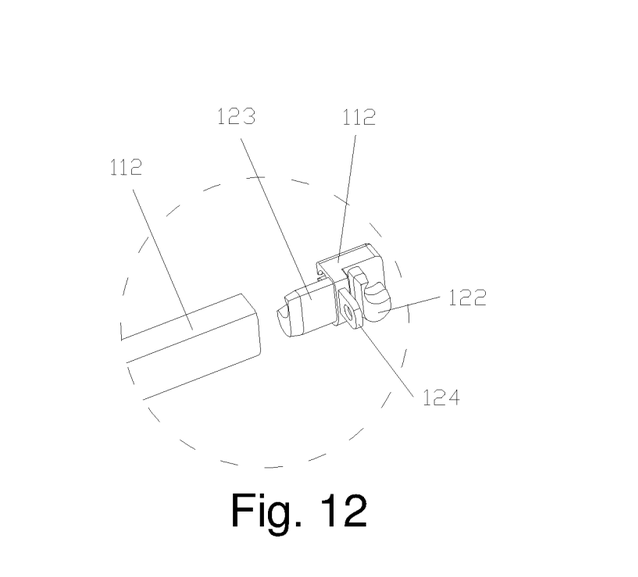
FIG. 12 is a schematic diagram of the vertical rod and the connector in embodiment of this invention.
Figure 13:
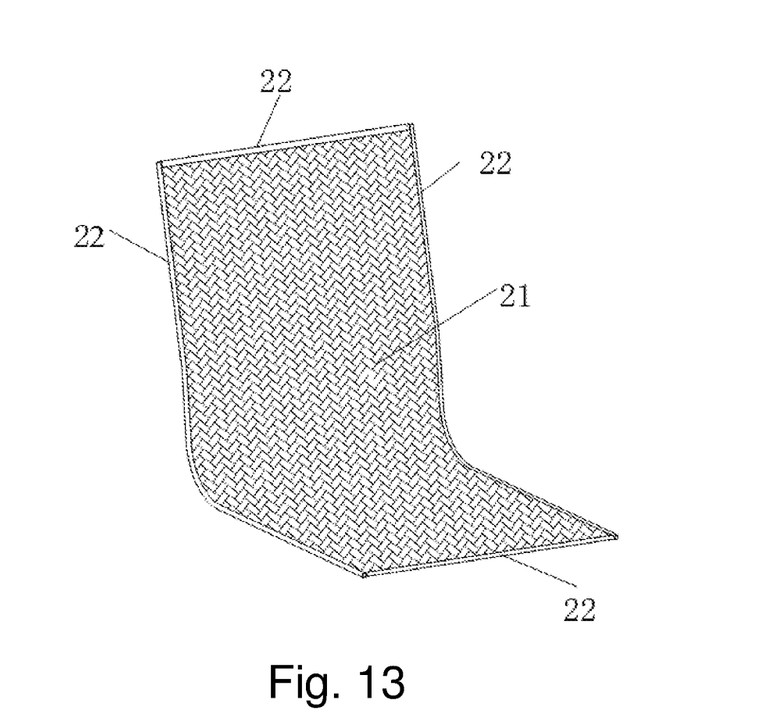
FIG. 13 is a schematic diagram of the chair back in embodiment of this invention.

When the horizontal rod 111 is connected to the vertical rod 112 with the connector 12, the first connection part 122 is inserted into the first through slot 1113 of the horizontal rod 111, and the second connection part 123 is inserted into the second through slot 1122 of the vertical rod 112.

The vertical rod 112 includes a seat section 1123 and a backrest section 1124. A connection between the seat section 1123 and the backrest section 1124 is a one-piece arc-shaped connection, and an angle between the seat section 1123 and the backrest section 1124 is larger than 90°. The rattan pieces 21 connected to the seat section 1123 form a seat, and the rattan pieces 21 connected to the backrest section 1124 form backrest. The connection between the seat section 1123 and the backrest section 1124 is in an arc shape, making the rattan pieces 21 transit smoothly at this connection, to reduce a damage rate of the rattan pieces 21. The angle between of the seat section 1123 and the backrest section 1124 is more than 90°, making the chair back 2 more ergonomic and more comfortable.

The support frame 3 include two support feet 31 and two support rods 32. Two support rods 32 both are disposed between two support feet 31, and are fixedly connected to the support feet 31. The frame 11 are fixedly connected to two support rods 32.

Each of the support feet 31 is in a "∩" shape. A top end of each of the support feet 31 form an armrest 311, and two free ends are slightly inclined outward to form a foot 312. Such structure of the support foot 31 is more stable, and the support foot 31 are beautiful in appearance.

The above mentioned is only a preferred embodiment of the present invention, and thus does not limit the scope of patent protection of the present invention. Any equivalent structural transformation made by using the specification and the contents of the drawings of the present invention is directly or indirectly applied to other related, and the technical field is equally included in the scope of protection of the present invention.

What is claimed is:

1. A rattan chair back connector assembly, comprising a rattan chair back connector and a frame, wherein the rattan chair back connector comprises a body, a first connection part, and a second connection part, wherein the body has a first side surface and a second side surface, the first side surface and the second side surface are adjacent, the first side surface in a step shape comprises a first step surface and a second step surface, the second step surface is higher than the first step surface, the first connection part is disposed at the first side surface, and the second connection part is disposed at the second side surface;

wherein the frame comprises a horizontal rod and a vertical rod, the first connection part of the connector and the horizontal rod are engaged, and the second connection part of the connector and the vertical rod are engaged, wherein a second rattan slot and a third rattan slot are respectively disposed at any one of the horizontal rod and the vertical rod, the second rattan slot and the third rattan slot are respectively disposed along a length direction of the horizontal rod and the vertical rod, and an opening gap of the second rattan slot and the third rattan slot is smaller than a width of a slot body.

2. The rattan chair back connector assembly according to claim 1, the connector further comprising a third connection part, wherein the third connection part is disposed at the second step surface, and a first connection hole is disposed at the third connection part.

3. The rattan chair back connector assembly according to claim 1, wherein the body further has a third side surface opposite the first side surface, the body has a first rattan slot, a slot mouth of the first rattan slot turn towards the third side surface of the body, and an opening gap of the slot mouth of the first rattan slot is smaller than a width of a slot body.

4. The rattan chair back connection assembly according to claim 1, wherein the horizontal rod and the vertical rod both are internal hollow and thin-walled tube shaped, the second rattan slot is formed by an inwardly depression of one of the sides of the horizontal rod, to form a first through slot inside the horizontal rod; a structure of the third rattan slot is same with a structure of the second rattan slot; the third rattan slot is disposed at the vertical rod, forming a second through slot inside the vertical rod, a shape of the first connection part of the connector is match with a shape of the first through slot, and a structure of the second connection part of the connector is match with a shape of the second through slot.

5. The rattan chair back connection assembly according to claim 1, wherein the vertical rod comprises a seat section and a backrest section, a connection between the seat section and the backrest section is a one-piece arc-shaped connection, and an angle between the seat section and the backrest section is larger than 90°.

6. The rattan chair back connection assembly according to claim 1, further comprising a fixer, a second connection hole is disposed at the horizontal rod, the first connection hole of the third connection part and the second connection hole of the horizontal rod are cooperated with the fixer to form a fix connection.

7. A rattan chair, comprising the rattan chair back connection assembly according to claim 1, further comprising a support frame and a chair back, wherein the frame of the rattan chair back connection assembly is fixedly disposed at the support frame, the chair back is disposed at the frame, the chair back comprises rattan pieces and a lock bar, the rattan pieces are woven from rattan; and the lock bar is disposed at a surrounding of the rattan pieces for an engaged connection between the frame and the connector.

8. The rattan chair according to claim 7, wherein the support frame comprises two support feet and two support rods, two support rods both are disposed between two support feet and are fixedly connected to the support feet, and the frame are fixedly connected to two support rods.

9. The rattan chair back connection assembly according to claim 4, wherein the vertical rod comprises a seat section and a backrest section, a connection between the seat section and the backrest section is a one-piece arc-shaped connection, and an angle between the seat section and the backrest section is larger than 90°.

10. The rattan chair according to claim 7, wherein the horizontal rod and the vertical rod both are internal hollow and thin-walled tube shaped, the second rattan slot is formed by an inwardly depression of one of the sides of the horizontal rod, to form a first through slot inside the horizontal rod; a structure of the third rattan slot is same with a structure of the second rattan slot; the third rattan slot is disposed at the vertical rod, forming a second through slot inside the vertical rod, a shape of the first connection part of the connector is match with a shape of the first through slot, and a structure of the second connection part of the connector is match with a shape of the second through slot.

11. The rattan chair according to claim 7, wherein the vertical rod comprises a seat section and a backrest section, a connection between the seat section and the backrest section is a one-piece arc-shaped connection, and an angle between the seat section and the backrest section is larger than 90°.

12. The rattan chair according to claim 7, further comprising a fixer, a second connection hole is disposed at the horizontal rod, the first connection hole of the third connection part and the second connection hole of the horizontal rod are cooperated with the fixer to form a fix connection.

* * * * *